Sept. 25, 1962 W. J. SAVAGE 3,055,439
CORRUGATOR
Filed Aug. 29, 1957 2 Sheets-Sheet 2

INVENTOR.
William J. Savage
BY Olson & Trexler
attys.

United States Patent Office 3,055,439
Patented Sept. 25, 1962

3,055,439
CORRUGATOR
William J. Savage, R.F.D., Kimberley, Idaho
Filed Aug. 29, 1957, Ser. No. 681,017
11 Claims. (Cl. 172—99)

This invention is concerned generally with an agricultural implement, and more particularly with an apparatus designed to be attached to a tractor for forming or cleaning corrugations in irrigated fields.

As is known, fields are commonly irrigated by conveying water from a source through a main ditch. Water from the main ditch flows into shallow grooves or corrugations extending across a field, and water that is not absorbed is discharged from the corrugations into a drain ditch at the opposite side of the field from the main ditch. Mechanical corrugators have been constructed to produce the corrugations or corrugates between the ditches. Unfortunately, prior corrugators leave about eight feet or ten feet adjacent each ditch, which cannot be finished by the corrugator. The usual procedure has been to finish or clean the corrugations by hand with a shovel. Hand cleaning is an expensive operation, and usually is not satisfactory since the corrugations produced are often not of uniform size.

Accordingly, it is an object of this invention to provide an improved corrugator, particularly one which can be attached to a tractor for operation.

More particularly, it is an object of this invention to provide a mechanical corrugator which will finish the corrugations substantially to the ditches at opposite sides of the field, without requiring extensive hand finishing.

It is a further object of this invention to provide a mechanical corrugator capable of turning to clean corrugations on curves, to point rows, etc., without requiring the repositioning of the tractor each time.

Figure 1:
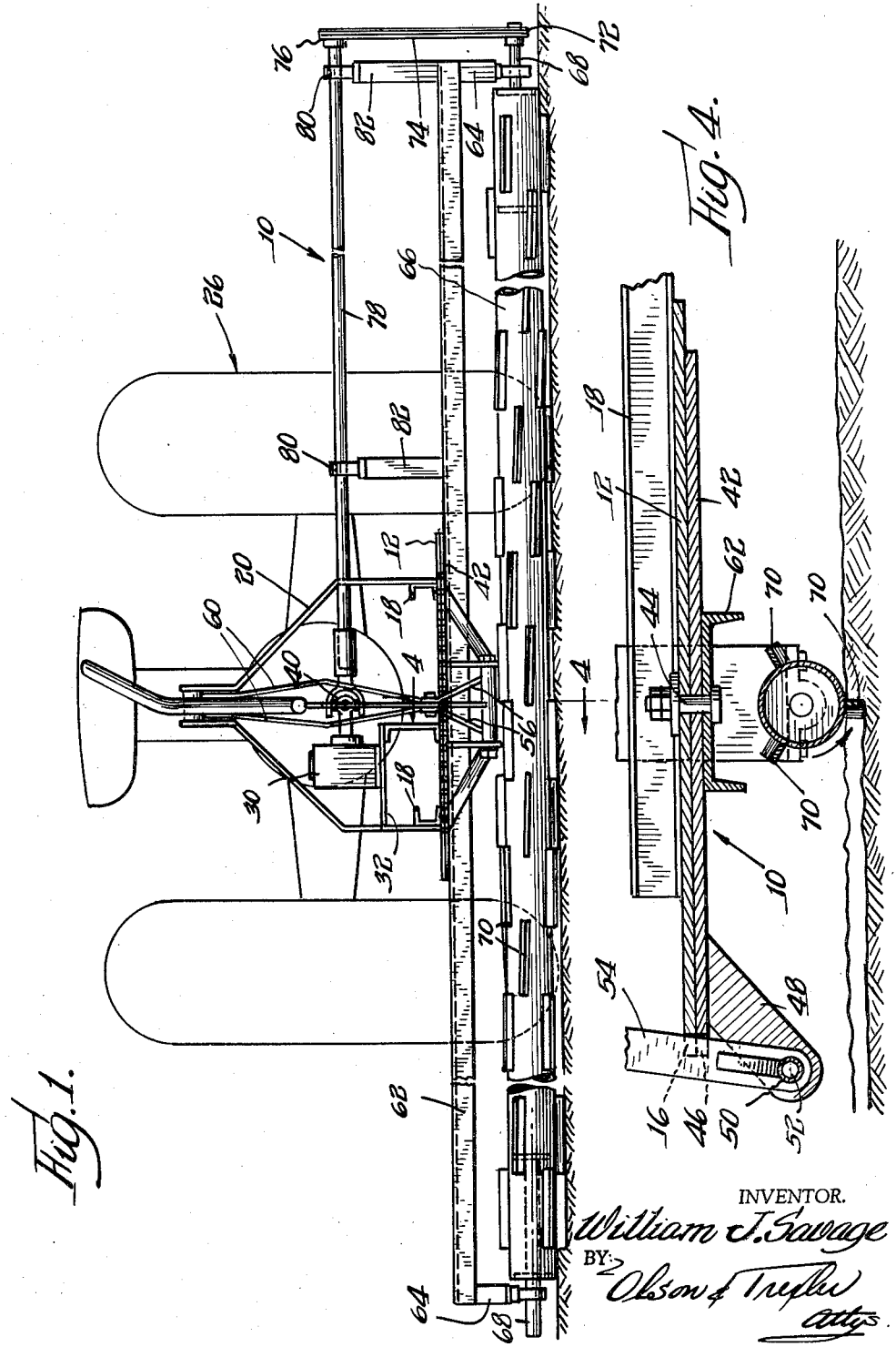
Figure 2:
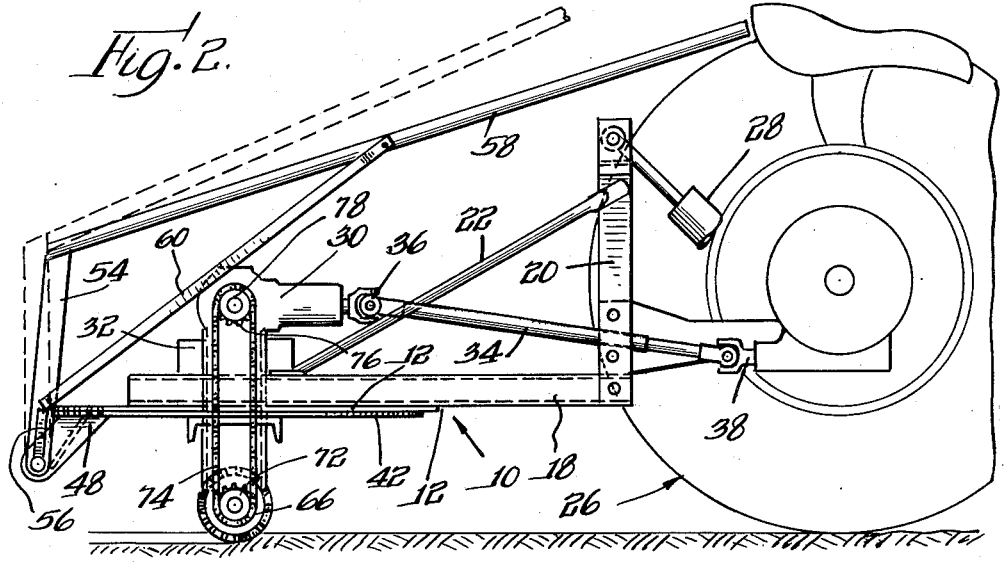
Figure 3:
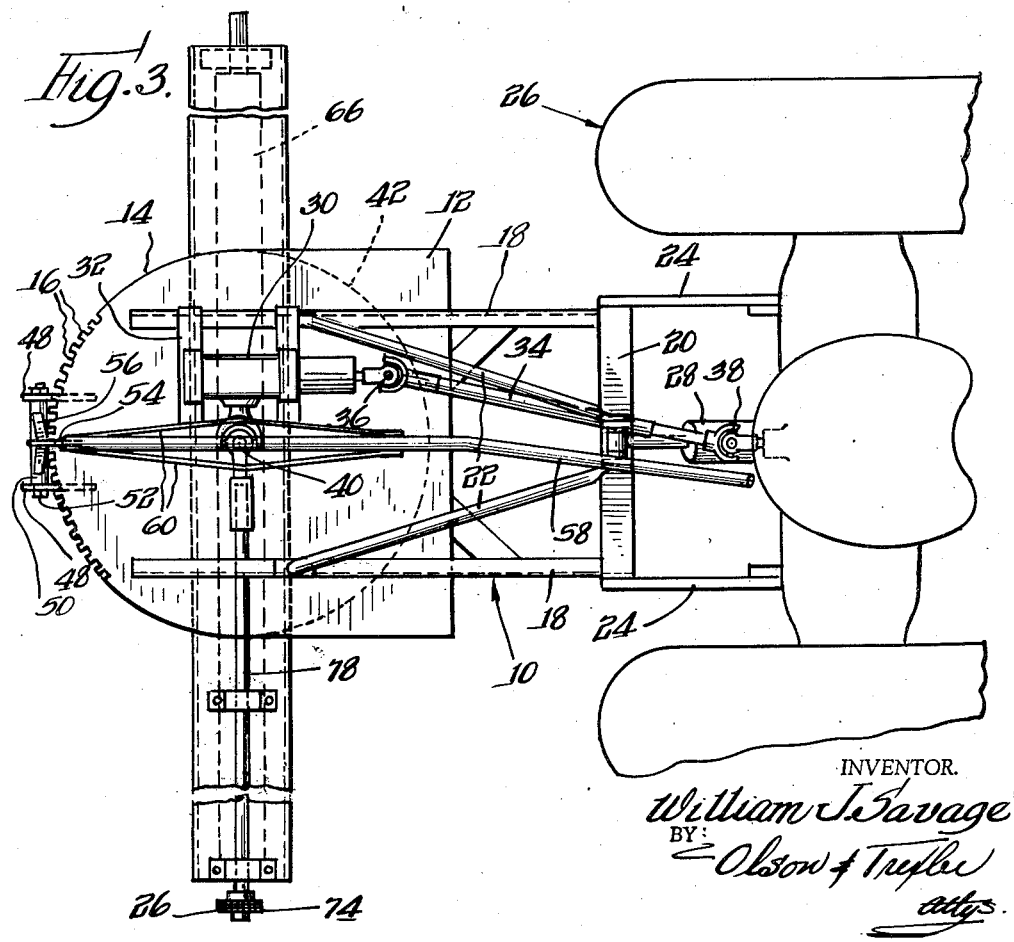

Other and further objects and advantages of the present invention will be apparent from the following description when taken in connection with the accompanying drawings wherein:

FIG. 1 is a rear view of a corrugator constructed in accordance with the principles of this invention, the corrugator being attached to a tractor;
FIG. 2 is a side view of the corrugator;
FIG. 3 is a plan view thereof; and
FIG. 4 is a vertical sectional view taken substantially along the line 4—4 in FIG. 1.

The corrugator as herein shown and described is designed to be attached to a tractor, and to be operated by the power take-off thereon. More particularly, the corrugator, identified by the numeral 10, comprises a flat steel plate or turntable top 12 of generally rectangular configuration, but having an arcuate or semi-circular rear edge 14 provide at the rear portion with alternate notches and teeth 16. Longitudinal channels 18 are welded to the top 12 and extend forwardly therefrom in parallel relation to the lower end of an upstanding A-frame 20. A diagonal strut 22 braces the A-frame, being welded to the A-frame and to the plate or turntable top 12. The bottom corners of the A-frame are secured by links 24 to suitable points of attachment on the tractor 26, while the top of the A-frame is connected to the tractor hydraulic hoist 28.

A reduction drive or gear box 30 is mounted above the turntable top 12 by a suitable framework 32, and is somewhat off center. A propeller shaft 34 is connected to the gear box 30 by means of a universal joint 36, and the front end of the propeller shaft is connected to the tractor power take-off universal joint at 38. The gear box 30 is provided with an output universal joint 40 located precisely above the center of curvature of the arcuate rear edge 14 of the turntable top.

A circular turntable 42 is located below the turntable top, and is pivotally connected thereto by a bolt 44 passing through the center of the turntable and through the center of the top 12.

The turntable is provided with a notch 46 on the rear edge thereof. A pair of bracket arms 48 is welded to the turntable, and depends therefrom on opposite sides of the notch 46 on the rear edge thereof. A tube 50 is pivotally mounted on a bolt 52 extending between the bracket arms 48. A straplike arm 54 is welded to the tube 50 and extends upwardly therefrom, being braced by oblique braces 56. An angle adjusting handle 58 extends upwardly and forwardly from the upper end of the arm 54 into proximity to the tractor seat, conveniently being provided with an angular deflected portion as shown. A strut 60 is welded to the arm 54 and to the handle 58 for bracing purposes.

Normally the arm 54 is received in the notch 46, and in one of the notches 16, whereby to lock the turntable in position relative to the turntable top. When it is desired to rotate the turntable, handle 58 is lifted and is pushed to one side or another. Lifting the handle disengages the arm 54 from the notches, and the turntable therefore is turned or rotated upon turning of the handle 58. Subsequent lowering of the handle 58 returns the arm 54 to the notch 46 and a newly aligned notch 16 to lock the turntable relative to the turntable top.

A downwardly directed channel 62 is welded to the bottom of the turntable 42, and also is secured by the bolt 44. The channel 62 extends transversely, and is provided with depending brackets 64 at the opposite ends thereof. A relatively large diameter pipe 66, on the order of four inches in diameter, and conveniently comprising standard steel well casing, is provided with axially extending shafts 68 which are journaled in the depending brackets 64. The pipe 66 is provided with a plurality of elongated teeth 70 welded at spaced intervals thereon. As a specific example, in one machine constructed in accordance with the principles of this invention the pipe 66 is eleven feet ten inches long. The teeth 70 comprise eight-inch lengths of three inches by one inch plow steel plate. Circumferentially aligned teeth are spaced 120° about the shaft. The teeth are spaced on fifteen-inch centers axially of the shaft, and are set at an angle to make one-third of a turn in the length of the shaft. Axially successive sets of teeth thus overlap slightly, and are equally arcuately offset. Accordingly, adjacent teeth are spaced 60° apart.

A sprocket 72 is fixed on an extending end of one of the shafts 68, and a drive chain 74 is passed over this sprocket, and over a sprocket 76 spaced above the channel 62. More particularly, the sprocket 76 is fixed on a drive shaft 78 supported parallel to the channel 62, and spaced thereabove by bearings 80 mounted on top of supports 82 upstanding from the channel. The universal joint 40 is secured to the drive shaft 78 for driving the same.

The drive connections are such that the underside of the pipe (comprising a ground engaging member) moves forwardly, i.e. in the direction of movement of the corrugator. Accordingly, dirt is swept in the forward direction.

As will now be apparent, the corrugator 10 is secured to the back of a tractor, and is pulled behind the tractor with the toothed pipe 62 positioned to dig into the ground approximately six inches. The tractor readily can be backed close to a ditch with the corrugator in raised position, the corrugator then being dropped to operating position. The spiral disposition of the teeth about the pipe causes the dirt cleaned from the corrugator to be fed toward one end of the pipe, and hence toward one side of the corrugator. As will be apparent, the turntable, and hence the pipe digger, can be turned to conform to the contour of the main ditch to the row, or for other purposes, as will be apparent to those skilled in this art.

The corrugator as herein shown and described is of rugged construction, and yet is economical to fabricate. The particularly illustrative example has been forth for illustration only, and various changes in structure will no doubt occur to those skilled in the art. Such changes are to be considered as a part of this invention, insofar as they fall within the scope and spirt of the appended claims.

The invention is claimed as follows:

1. A mechanical corrugator comprising a frame adapted to be attached to a tractor and including a substantially horizontal portion and an upstanding A-frame at the forward end thereof, said frame having secured thereto a member having an arcuate rear edge with a succession of arcuately spaced notches thereon, a turntable pivotally supported from said frame and adapted for rotation about a substantially vertical axis, an elongated support secured to said turntable and orientated substantially transverse of the direction of movement of said corrugator, said support pivoting upon rotation of said turntable, an elongated ground engaging member rotatably supported from said elongated support and spaced therebeneath, said ground engaging member having a plurality of sets of teeth thereon, there being a plurality of teeth per set circumferentially spaced about said ground engaging member, a set of teeth being elongated substantially axially of said ground engaging member, there being a plurality of sets thereof spaced axially of said ground engaging member and spirally offset thereon, a shaft above said support and substantially parallel thereto, means operatively connecting said shaft to said ground engaging member for rotation thereof with the lower portion of said ground engaging member moving in the direction of movement of said corrugator, a gear box supported from said frame off center of said turntable, a universal joint connecting said gear box to said shaft in axial alignment with the pivot center of said turntable, an input shaft connected to said gear box and adapted for connection to the power take-off of a tractor, a locking bar pivotally secured to said turntable, said turntable having a notch receiving said bar, said bar being selectively received in the previously mentioned notches, and a handle secured to said bar for locking and unlocking the turntable and for rotating the turntable.

2. A mechanical corrugator comprising a frame adapted to be attached to a tractor, a turntable carried by said frame for pivoting about a substantially vertical axis, a ground engaging member rotatably carried by said frame and oriented substantially transversely of the direction of movement of said corrugator, said ground engaging member pivoting with said turntable, a plurality of teeth on said ground engaging member, and means adapted for connection to the power take-off of a tractor for rotatably driving said ground engaging member, wherein the means adapted for attachment to a tractor power take-off includes a gear box, means mounting said gear box off center of said turntable, a drive shaft operatively connected to said ground engaging member, and a universal joint driving said drive shaft from said gear box and located above the pivot center of said turntable.

3. A mechanical corrugator comprising frame means including an upstanding A-frame and an elongated subframe extending transversely of the direction of travel of the tractor, said A-frame and said subframe each having a horizontal attachment portion mating one with the other, means pivotally connecting said attachment portions for relative rotation therebetween about a substantially vertical axis, an elongated ground engaging member substantially co-extensive with said subframe and having a plurality of sets of teeth axially elongated along the ground engaging member with the teeth of each set being spaced circumferentially to be disposed intermediate the spacing between adjacent teeth of an adjacent set of teeth, a gear box supported on said frame means and having a forwardly projecting input shaft and laterally projecting output shaft means extending to a point adjacent an outer end of said ground engaging member, a propeller shaft having a universal joint connection at one end with said input shaft and adapted for attachment at its other end to a tractor power take-off, and means rotatably interconnecting the outer end of said output shaft means with said ground engaging member for rotating the latter.

4. A mechanical corrugator as claimed in claim 3, wherein the sides of the A-frame carry links adapted for attachment to a tractor and wherein the propeller shaft extends through the sides of the A-frame for attachment to the tractor power take-off.

5. A mechanical corrugator as claimed in claim 3, wherein there is provided hydraulic control means between the frame means and the tractor for controlling the position of said subframe.

6. A mechanical corrugator as claimed in claim 3, wherein the subframe includes means accessible on the tractor for locking the subframe in predetermined positions of relative adjustment about the vertical axis pivotal connection between the said attachment portions.

7. A mechanical corrugator comprising main frame means including an upstanding A-frame adapted to be attached to a tractor and having a horizontal portion to support pivot means, an elongated subframe extending transversely of the direction of travel of the tractor and including an attachment portion to mate with said horizontal portion, means pivotally connecting said attachment portion and said horizontal portion for relative movement therebetween about a substantially vertical axis and connecting the subframe to said main frame means, an elongated ground engaging member substantially co-extensive with said subframe and having a plurality of sets of teeth axially elongated along the ground engaging member with the teeth of each set being spaced circumferentially to be disposed intermediate the spacing between adjacent teeth of an adjacent set of teeth, a gear box supported above said subframe and having a forwardly projecting input shaft and laterally projecting output shaft means extending to a point adjacent an outer end of said ground engaging member, a propeller shaft having a universal joint connection at one end with said input shaft and adapted for attachment at its other end to a tractor power take-off, and means rotatably interconnecting the outer end of said output shaft means with said ground engaging member for rotating the latter.

8. A mechanical corrugator as claimed in claim 7, wherein the gear box is supported on the main frame means and wherein the output shaft means includes a universal connection on the vertical axis of the pivotal connection between the subframe and the main frame means.

9. A mechanical corrugator as claimed in claim 8, wherein the propeller shaft extends rearwardly through the A-frame for its attachment to a tractor power take-off.

10. A mechanical corrugator comprising frame means including an upstanding A-frame and an elongated subframe extending transversely of the direction of travel of the tractor, said A-frame and said subframe each having a horizontal attachment portion mating one with the other, means pivotally connecting said attachment portions for relative rotation therebetween about a substantially vertical axis, an elongated ground engaging member substantially co-extensive with said subframe and having a plurality of sets of teeth axially elongated along the ground engaging member, a gear box supported on said frame means and having a forwardly projecting input shaft and laterally projecting output shaft means extending to a point adjacent an outer end of said ground engaging member, a propeller shaft having a universal joint connection at one end with said input shaft and adapted for attachment at its other end to a tractor power take-off, and means rotatably interconnecting the outer end of said output shaft means with said ground engaging member for rotating the latter.

11. A mechanical corrugator as claimed in claim 10, wherein the teeth are set at an angle to the longitudinal axis of the ground engaging member with the teeth of each set circumferentially offset with respect to the teeth of an adjacent set and with the teeth of alternate sets being in alignment along the length of the ground engaging member.

References Cited in the file of this patent

UNITED STATES PATENTS

| | | |
|---|---|---|
| 942,376 | Clardy | Dec. 7, 1909 |
| 1,010,238 | Cook et al. | Nov. 28, 1911 |
| 1,106,541 | Bruce | Aug. 11, 1914 |
| 1,176,626 | Verge | Mar. 21, 1916 |
| 1,194,067 | Reed | Aug. 8, 1916 |
| 1,328,800 | Sherrod | Jan. 20, 1920 |
| 1,808,984 | Heinmiller | June 9, 1931 |
| 1,935,811 | Metcalf | Nov. 21, 1933 |
| 2,213,300 | Boerma | Sept. 3, 1940 |
| 2,312,164 | Holzbock | Feb. 23, 1943 |
| 2,379,469 | Bagan | July 3, 1945 |
| 2,526,396 | Nowlin | Oct. 17, 1950 |
| 2,564,355 | Danuser | Aug. 14, 1951 |
| 2,788,726 | Keyes | Apr. 16, 1957 |
| 2,870,850 | Dethlefsen | Jan. 27, 1959 |

FOREIGN PATENTS

| | | |
|---|---|---|
| 552,167 | Italy | Nov. 28, 1956 |